US012056217B2

(12) United States Patent
Chou et al.

(10) Patent No.: US 12,056,217 B2
(45) Date of Patent: Aug. 6, 2024

(54) MULTIMEDIA PIRACY DETECTION WITH MULTI-PHASE SAMPLING AND TRANSFORMATION

(71) Applicant: AT&T Intellectual Property I, L.P., Atlanta, GA (US)

(72) Inventors: Di Chou, Colts Neck, NJ (US); James Ho, Bridgewater, NJ (US); Chinglung Wen, Princeton, NJ (US)

(73) Assignee: AT&T Intellect al Property I, L.P., Atlanta, GA (US)

( * ) Notice: Subject to any disclaimer, the term of this patent is extended or adjusted under 35 U.S.C. 154(b) by 344 days.

(21) Appl. No.: 17/517,923

(22) Filed: Nov. 3, 2021

(65) Prior Publication Data

US 2023/0137496 A1 May 4, 2023

(51) Int. Cl.
*G06F 21/10* (2013.01)
*G06N 20/00* (2019.01)

(52) U.S. Cl.
CPC ............. *G06F 21/10* (2013.01); *G06N 20/00* (2019.01)

(58) Field of Classification Search
CPC .................................. G06F 21/10; G06N 20/00
See application file for complete search history.

(56) References Cited

U.S. PATENT DOCUMENTS

| | | | | |
|---|---|---|---|---|
| 2009/0254933 | A1* | 10/2009 | Gupta | H04H 20/14 725/18 |
| 2017/0371963 | A1* | 12/2017 | Bilobrov | G06F 16/2255 |
| 2017/0372142 | A1* | 12/2017 | Bilobrov | H04N 21/2187 |
| 2019/0028766 | A1* | 1/2019 | Wold | G06Q 50/184 |
| 2022/0027407 | A1* | 1/2022 | Ikezoye | G06F 16/683 |

\* cited by examiner

*Primary Examiner* — Theodore C Parsons

(57) ABSTRACT

Multimedia piracy detection (e.g., using a computerized tool) is enabled. A system can comprise a memory that stores executable instructions that, when executed by a processor, facilitate performance of operations, comprising: determining, based on a time domain and/or a frequency domain associated with original digital media content (e.g., and respective digital transportation) and using a counterfeit digital media content model, whether digital media content comprises a counterfeit of an authorized release of the original digital media content, wherein the counterfeit digital media content model has been generated based on machine learning applied to time domains and/or frequency domains of past original digital media content (e.g., and respective digital transportation) and to past digital media content (e.g., counterfeit digital media content) (e.g., and respective digital transportation), and based on a determination that the digital media content comprises the counterfeit, flagging (and/or determining a probability that) the digital media content as counterfeit.

20 Claims, 15 Drawing Sheets

1200

1202 — DETERMINING, BASED ON A FREQUENCY DOMAIN ASSOCIATED WITH ORIGINAL DIGITAL MEDIA CONTENT AND USING A COUNTERFEIT DIGITAL MEDIA CONTENT MODEL, WHETHER DIGITAL MEDIA CONTENT COMPRISES A COUNTERFEIT OF AN APPROVED RELEASE OF THE ORIGINAL DIGITAL MEDIA CONTENT, WHEREIN THE COUNTERFEIT DIGITAL MEDIA CONTENT MODEL HAS BEEN GENERATED BASED ON MACHINE LEARNING APPLIED TO TIME DOMAINS AND FREQUENCY DOMAINS OF PAST ORIGINAL DIGITAL MEDIA CONTENT OTHER THAN THE ORIGINAL DIGITAL MEDIA CONTENT AND TO PAST DIGITAL MEDIA CONTENT OTHER THAN THE DIGITAL MEDIA CONTENT, AND WHEREIN THE PAST DIGITAL MEDIA CONTENT COMPRISES COUNTERFEIT DIGITAL MEDIA CONTENT

1204 — BASED ON A DETERMINATION THAT THE DIGITAL MEDIA CONTENT THRESHOLD SATISFIES A DEFINED COUNTERFEIT CRITERION, DETERMINING THAT THE DIGITAL MEDIA CONTENT COMPRISES POTENTIALLY COUNTERFEIT DIGITAL MEDIA CONTENT

1302 — DETERMINING, BY NETWORK EQUIPMENT COMPRISING A PROCESSOR, BASED ON A FREQUENCY DOMAIN ASSOCIATED WITH ORIGINAL DIGITAL MEDIA CONTENT AND USING A COUNTERFEIT DIGITAL MEDIA CONTENT MODEL, WHETHER DIGITAL MEDIA CONTENT COMPRISES A COUNTERFEIT OF THE ORIGINAL DIGITAL MEDIA CONTENT, WHEREIN THE COUNTERFEIT DIGITAL MEDIA CONTENT MODEL HAS BEEN GENERATED BASED ON MACHINE LEARNING APPLIED TO TIME DOMAINS AND FREQUENCY DOMAINS OF PAST ORIGINAL DIGITAL MEDIA CONTENT OTHER THAN THE ORIGINAL DIGITAL MEDIA CONTENT AND TO PAST DIGITAL MEDIA CONTENT OTHER THAN THE DIGITAL MEDIA CONTENT, AND WHEREIN THE PAST DIGITAL MEDIA CONTENT COMPRISES COUNTERFEIT DIGITAL MEDIA CONTENT

1304 — BASED ON A DETERMINATION THAT THE DIGITAL MEDIA CONTENT THRESHOLD SATISFIES A DEFINED COUNTERFEIT CRITERION, DETERMINING, BY THE NETWORK EQUIPMENT, THAT THE DIGITAL MEDIA CONTENT COMPRISES POTENTIALLY COUNTERFEIT DIGITAL MEDIA CONTENT

1306 — IN RESPONSE TO THE DETERMINING THAT THE DIGITAL MEDIA CONTENT COMPRISES POTENTIALLY COUNTERFEIT DIGITAL MEDIA CONTENT, SENDING, BY THE NETWORK EQUIPMENT TO A DEVICE COMMUNICATIVELY COUPLED TO THE NETWORK EQUIPMENT, AN ALERT SIGNAL REPRESENTATIVE OF THE DETERMINATION THAT THE DIGITAL MEDIA CONTENT COMPRISES POTENTIALLY COUNTERFEIT DIGITAL MEDIA CONTENT

FIG. 13

MULTIMEDIA PIRACY DETECTION WITH MULTI-PHASE SAMPLING AND TRANSFORMATION

TECHNICAL FIELD

The disclosed subject matter relates to piracy detection and, more particularly, to multimedia piracy detection with multi-phase sampling and transformation.

BACKGROUND

Media piracy is a longstanding issue. When video home system (VHS), tapes were in mainstream use, some fraudsters purchased or rented a VHS tape and made physical copies for resale, undercutting the sale of authorized copies. More recently, fraudsters engaged in the illicit creation of digital video discs (DVDs) by renting or buying a single original copy, and then making unauthorized copies for resale, again, undercutting authorized copies for sale.

The proliferation of the internet, along with increases in internet speeds, have enabled fraudsters to profit from significantly more exploited, unauthorized content. For example, a fraudster, being a legitimate subscriber of a digital media content provider's services, can obtain media contents (intended for the subscriber's viewing only) from a valid source, such as the content provider's streaming web or mobile application. The fraudster can capture the content using a number of available methods, then resell the contents illegally. One such method is camripping of a just-released movie, then streaming the content to the fraudster's subscribers via the internet in near real-time, thus generating a large profit for the fraudster at the expense of the original media content owner/producer. Additionally, music and movies can be illegally shared on file sharing platforms. Such examples, among others, can lead to tremendous financial and reputational losses for content creators and media corporations, as pirated videos have been reported to receive over 230 billion views per year.

The above-described background relating to piracy detection is merely intended to provide a contextual overview of some current issues and is not intended to be exhaustive. Other contextual information may become further apparent upon review of the following detailed description.

BRIEF DESCRIPTION OF DRAWINGS

FIG. 12 is a block flow diagram for a process associated with multimedia piracy detection in accordance with one or more embodiments described herein.

FIG. 13 is a block flow diagram for a process associated with multimedia piracy detection in accordance with one or more embodiments described herein.

DETAILED DESCRIPTION

Figure 1:
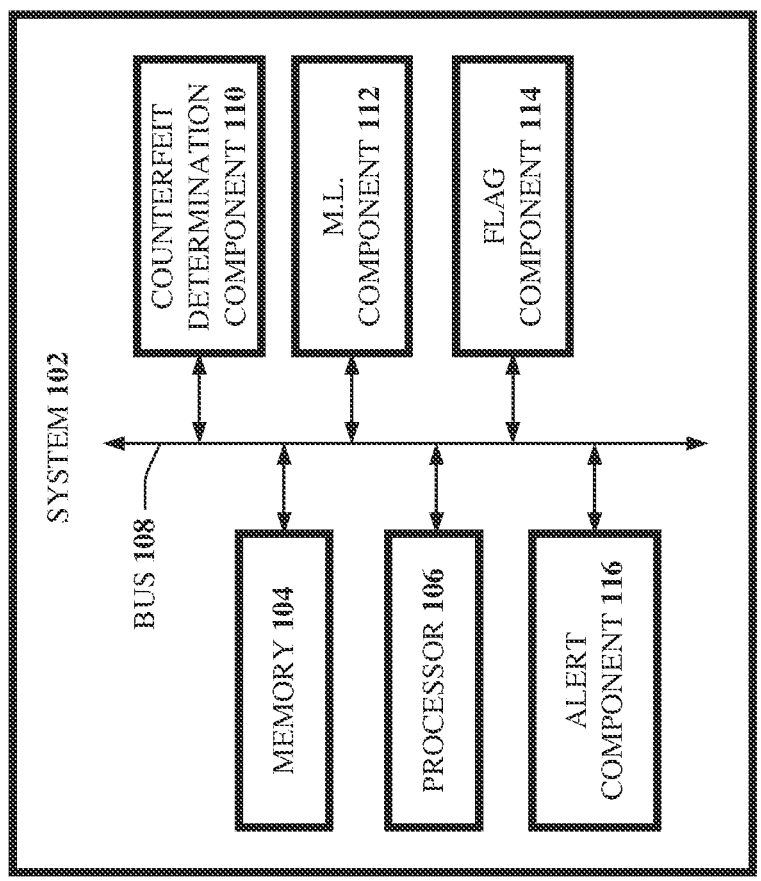
FIG. 1 is a block diagram of an exemplary system in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, multimedia piracy detection can be improved in various ways, and various embodiments are described herein to this end and/or other ends.

According to an embodiment, a system can comprise a processor, and a memory that stores executable instructions that, when executed by the processor, facilitate performance of operations, comprising: determining (e.g., based on a time domain and/or a frequency domain associated with original digital media content and/or respective digital transportation and using a counterfeit digital media content model) whether digital media content comprises a counterfeit of an authorized release of the original digital media content, wherein the counterfeit digital media content model has been generated based on machine learning applied to time domains and/or to frequency domains of past original digital media content other than the original digital media content (e.g., and respective digital transportation) and to past digital media content (e.g., and respective digital transportation) other than the digital media content (e.g., and respective digital transportation), and wherein the past digital media content comprises counterfeit digital media content, and based on a determination that the digital media content comprises the counterfeit, flagging the digital media content as being counterfeit. In further embodiments, the operations can further comprise determining and/or flagging a likelihood or probability (e.g., using the counterfeit digital media content model) that the digital media content is counterfeit.

In various embodiments, the counterfeit digital media content model can be further generated based on an output of a process, comprising: concurrently sampling, in the time domain, the past original digital media content and the past digital media content, and based on a first past result of concurrently sampling, in the time domain, the past original digital media content and the past digital media content, determining a second past result, wherein the second past result comprises the frequency domain associated with the first past result. In various implementations, the counterfeit digital media content model can be further based on associated digital transportation of respective digital media content.

In one or more embodiments, the counterfeit digital media content model has been further generated by filtering the first past result using a first signal filter and the second past result using a second signal filter.

In some embodiments, the counterfeit digital media content model has been further generated based on a result of a comparison between an attribute associated with the past original digital media content (e.g., and respective digital transportation) and an attribute associated with the past digital media content (e.g., and respective transportation). In this regard, determining whether the digital media content comprises the counterfeit can be further based on a result of a comparison between an attribute associated with the original digital media content (e.g., and respective digital transportation) and an attribute associated with the digital media content (e.g., and respective digital transportation).

It is noted that the attribute associated with the original digital media content can comprise an implicit attribute. In various embodiments, the implicit attribute can comprise a compression attribute associated with the original digital media content and/or a start time associated with the original digital media content or an end time associated with the original digital media content.

It is additionally noted that the attribute associated with the original digital media content can comprise an explicit attribute. In various embodiments, the explicit attribute can comprise a start time or an end time of an event associated with the original digital media content and/or advertisement information representative of an advertisement associated with the original digital media content.

In another embodiment, a non-transitory machine-readable medium can comprise executable instructions that, when executed by a processor, facilitate performance of operations, comprising: determining, based on a frequency domain associated with original digital media content and using a counterfeit digital media content model, whether digital media content comprises a counterfeit of an approved release of the original digital media content, wherein the counterfeit digital media content model has been generated based on machine learning applied to time domains and frequency domains of past original digital media content other than the original digital media content and to past digital media content other than the digital media content, and wherein the past digital media content comprises counterfeit digital media content, and based on a determination that the digital media content threshold satisfies a defined counterfeit criterion, determining that the digital media content comprises potentially counterfeit digital media content.

In various embodiments, the original digital media content can comprise a segment of video or audio content.

In one or more embodiments, the above operations can further comprise: in response to the determination that the digital media content threshold satisfies the defined counterfeit criterion, suspending network connectivity between a device determined to be associated with the digital media content and a network employed by the device to transmit content comprising the digital media content.

In some embodiments, the above operations can further comprise: in response to the determination that the digital media content threshold satisfies the defined counterfeit criterion, bandwidth throttling a connection between a device determined to be associated with the digital media content and a network via which the device is determined to transmit content comprising the digital media content, wherein bandwidth throttling the connection comprises limiting onward communication speed between the device and the network to less than a communication speed determined to be sufficient for uninterrupted transmission of the digital media content via the network.

In an embodiment, the above operations can further comprise: in response to the determination that the digital media content threshold satisfies the defined counterfeit criterion, facilitating a non-broadcasted playback of the potentially counterfeit digital media content, comparing the potentially counterfeit digital media content to the original digital media content, and in response to a determination that the potentially counterfeit digital media content and original digital media content threshold satisfy a similarity criterion, determining that the potentially counterfeit digital media content comprises counterfeit digital media content.

It is noted that the digital media content can comprise a live streaming broadcast of an event, prerecorded digital media content, or other content.

According to yet another embodiment, a method can comprise: determining, by network equipment comprising a processor, based on a frequency domain associated with original digital media content and using a counterfeit digital media content model, whether digital media content comprises a counterfeit of the original digital media content, wherein the counterfeit digital media content model has been generated based on machine learning applied to time domains and frequency domains of past original digital media content other than the original digital media content and to past digital media content other than the digital media content, and wherein the past digital media content comprises counterfeit digital media content, based on a determination that the digital media content threshold satisfies a defined counterfeit criterion, determining, by the network equipment, that the digital media content comprises potentially counterfeit digital media content, and in response to the determining that the digital media content comprises potentially counterfeit digital media content, sending, by the network equipment to a device communicatively coupled to the network equipment, an alert signal representative of the determination that the digital media content comprises potentially counterfeit digital media content.

In various embodiments, the counterfeit digital media content model can be further generated by: concurrently sampling, by the network equipment, in a time domain, the past original digital media content and the past digital media content, and based on a first past result of concurrently sampling in the time domain, the past original digital media content and the past digital media content, determining, by the network equipment, a second past result, wherein the second past result comprises the frequency domain associated with the first past result.

In some embodiments, the counterfeit digital media content model can be further generated, by the network equipment, based on a result of a comparison between an attribute associated with the past original digital media content and an attribute associated with the past digital media content, and determining whether the digital media content comprises the counterfeit can be further based on a result of a comparison, by the network equipment, between an attribute associated with the original digital media content and an attribute associated with the digital media content.

It should be appreciated that additional manifestations, configurations, implementations, protocols, etc. can be utilized in connection with the following components described herein or different/additional components as would be appreciated by one skilled in the art.

Turning now to FIG. 1, there is illustrated an example, non-limiting system 102 in accordance with one or more embodiments herein. System 102 can comprise a computerized tool, which can be configured to perform various operations relating to multimedia piracy detection. The system 102 can comprise one or more of a variety of components, such as memory 104, processor 106, bus 108, counterfeit determination component 110, machine learning (M.L.) component 112, flag component 114, and/or alert component 116.

In various embodiments, one or more of the memory 104, processor 106, bus 108, counterfeit determination component 110, M.L. component 112, flag component 114, and/or alert component 116 can be communicatively or operably coupled (e.g., over a bus or wireless network) to one another to perform one or more functions of the system 102.

According to an embodiment, the counterfeit determination component 110 can determine (e.g., based on a time domain and/or a frequency domain associated with original digital media content and/or using a counterfeit digital media content model) whether digital media content comprises a counterfeit of an authorized or approved release of the original digital media content. It is noted that an authorized or approved release can comprise paid and/or licensed stream or copy of such original digital media content. According to an embodiment, the counterfeit digital media content model can be generated based on machine learning (e.g., using M.L. component 112) applied to time domains and/or frequency domains of past original digital media content other than the original digital media content and/or to past digital media content other than the digital media content. For example, the M.L. component 112 can analyze both time domains and frequency domains of original movies, TV shows, sports games, or other past original digital media content and past digital media content (e.g., known to be pirated copies of the past original digital media content.) The foregoing can be utilized (e.g., by the M.L. component 112) to generate the counterfeit digital media content model which can be leveraged by the counterfeit determination component 110 to determine future pirated/counterfeit digital media content. It is noted that said original digital media content (e.g., audio and/or video content) can comprise a segment of the original media content. In this regard, the system 102 or a respective component, such as the M.L. component 112, can segment original content into smaller sections (e.g., clips) of said original content. In various embodiments, digital media content herein can comprise live streaming broadcasts of event(s) (e.g., live sports events or debuts of new movies, TV shows, or songs), prerecorded digital media (e.g., existing movies, TV shows, or songs), or other digital media content.

According to an embodiment, the flag component 114 can (e.g., based on a determination by the counterfeit determination component 110 that the digital media content comprises the counterfeit) flag digital media content as being counterfeit. In further embodiments, the flag component and/or M.L. component 112 can determine a likelihood/probability (e.g., using the counterfeit digital media content model) that the digital media content is counterfeit. Such a flag and/or probability can be appended to or associated with a file associated with the counterfeit digital media content. In further embodiments, the alert component 116 can, in response to a determination (e.g., by the counterfeit determination component 110) that digital media content comprises counterfeit or potentially counterfeit digital media content, send, to a device communicatively coupled to the network equipment, an alert signal representative of the determination that the digital media content comprises counterfeit or potentially counterfeit digital media content. Such a device can comprise a mobile device, computer, server, or another device communicatively coupled to the network equipment.

According to an embodiment, the M.L. component 112 can concurrently sample (e.g., in a time domain) past original digital media content and past digital media content. In this regard, the M.L. component 112 can, based on a first past result of concurrently sampling (e.g., in the time domain) the past original digital media content and the past digital media content, determine a second past result. In this regard, the second past result can comprise the frequency domain associated with the first past result.

According to an embodiment, the M.L. component 112 can further generate the counterfeit digital media content model based on a result of a comparison between an attribute associated with the past original digital media content and an attribute associated with the past digital media content. In this regard, the determination (e.g., by the counterfeit determination component 110) of whether the digital media content comprises the counterfeit or is potentially counterfeit or pirated can be further based on a result of a comparison between an attribute associated with the original digital media content and an attribute associated with the digital media content. It is noted that attributes herein can comprise one or more implicit attributes and/or one or more explicit attributes. For example, implicit attributes can comprise compression, audio or video format, quality, resolution, compression, file size, protocol utilized, start time, end time, or other suitable implicit attributes. Explicit attributes can comprise, for instance, event start time, event end time, duration, ads used or ad lengths, or other suitable explicit attributes. In this regard, the counterfeit determination component 110 can determine whether a threshold similarity exists between attributes of digital media content herein (e.g., between original digital media content and potentially pirated or counterfeit digital media content). In response to such a threshold similarity being determined to exist (e.g., by the M.L. component 112), the counterfeit determination component 110 can then determine that the digital media content comprises the counterfeit or is at least potentially counterfeit or pirated.

Various embodiments herein can employ artificial-intelligence or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

It is noted that systems and/or associated controllers, servers, or machine learning components herein can comprise artificial intelligence component(s) which can employ an artificial intelligence (A.I.) model and/or M.L. or an M.L. model that can learn to perform the above or below described functions (e.g., via training using historical training data and/or feedback data).

In some embodiments, M.L. component 112 can comprise an A.I. and/or M.L. model that can be trained (e.g., via supervised and/or unsupervised techniques) to perform the above or below-described functions using historical training data comprising various context conditions that correspond to various augmented network optimization operations. In this example, such an A.I. and/or M.L. model can further learn (e.g., via supervised and/or unsupervised techniques) to perform the above or below-described functions using training data comprising feedback data, where such feedback data can be collected and/or stored (e.g., in memory) by the M.L. component 112. In this example, such feedback data can comprise the various instructions described above/below that can be input, for instance, to a system herein, over time in response to observed/stored context-based information.

A.I./M.L. components herein can initiate an operation(s) associated with a based on a defined level of confidence determined using information (e.g., feedback data). For example, based on learning to perform such functions described above using feedback data, performance information, and/or past performance information herein, an M.L. component 112 herein can initiate an operation associated with determining various thresholds herein (e.g., a QoS threshold, a privacy threshold, a hardware threshold, or another suitable threshold).

In an embodiment, the M.L. component 112 can perform a utility-based analysis that factors cost of initiating the above-described operations versus benefit. In this embodiment, the M.L. component 112 can use one or more additional context conditions to determine various thresholds herein.

To facilitate the above-described functions, a M.L. component 112 herein can perform classifications, correlations, inferences, and/or expressions associated with principles of artificial intelligence. For instance, the M.L. component 112 can employ an automatic classification system and/or an automatic classification. In one example, the M.L. component 112 can employ a probabilistic and/or statistical-based analysis (e.g., factoring into the analysis utilities and costs) to learn and/or generate inferences. The M.L. component 112 can employ any suitable machine-learning based techniques, statistical-based techniques and/or probabilistic-based techniques. For example, the M.L. component 112 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, the M.L. component 112 can perform a set of machine-learning computations. For instance, the M.L. component 112 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 2:
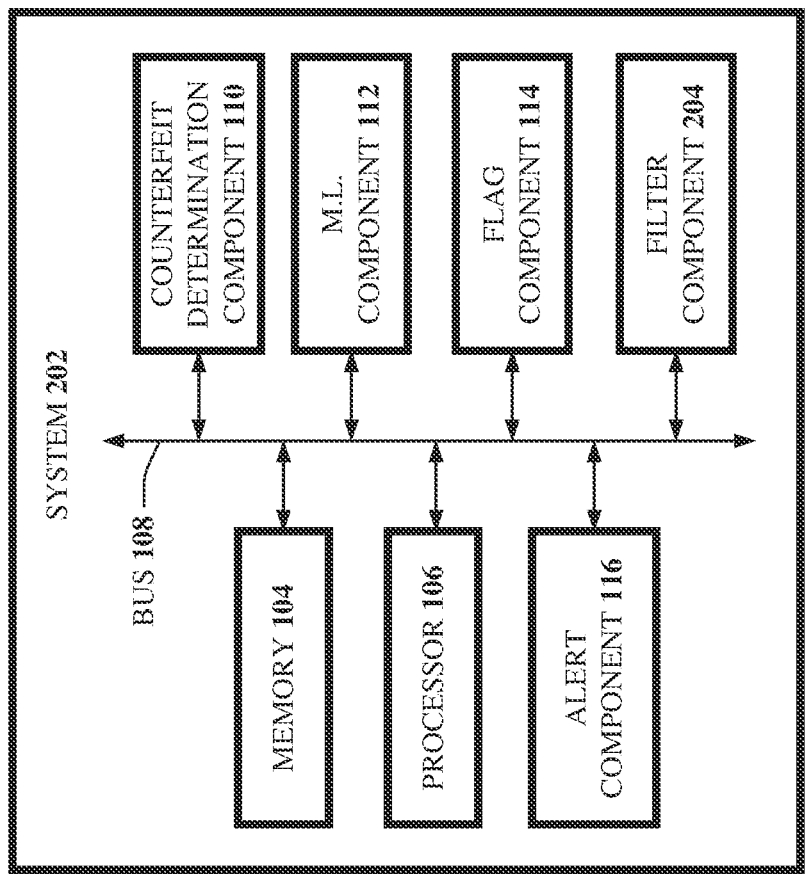
FIG. 2 is a block diagram of an exemplary system in accordance with one or more embodiments described herein.

Turning now to FIG. 2, there is illustrated an example, non-limiting system 202 in accordance with one or more embodiments herein. System 202 can comprise a computerized tool, which can be configured to perform various operations relating to multimedia piracy detection. The system 202 can be similar to system 102, and can comprise one or more of a variety of components, such as memory 104, processor 106, bus 108, counterfeit determination component 110, M.L. component 112, flag component 114, and/or alert component 116. The system 202 can additionally comprise a filter component 204.

In various embodiments, one or more of the memory 104, processor 106, bus 108, counterfeit determination component 110, M.L. component 112, flag component 114, alert component 116, and/or filter component 204 can be communicatively or operably coupled (e.g., over a bus or wireless network) to one another to perform one or more functions of the system 202.

According to an embodiment, the M.L. component 112 can further generate the counterfeit digital media content model based on a result of filtering, by the filter component 204, the first past result using a first signal filter and the second past result using a second signal filter. According to an embodiment, the filter component 204 can comprise a signal filter. In this regard, such filtering can comprise using such a signal filter to remove data points representative of outliers or noise. For example, a signal representative of IP packet flow can be filtered using such a signal filter herein. It is also noted that utilizing a Fourier Transformation, a Laplace Transformation, and/or another suitable transformation to isolate content transmitted over a transport network, which can have a filtering effect in that greater insight into types of content transmitted over the transport network can be obtained. Additionally, such digital signal filter can be configured to filter out signals that may have been added to an original video or audio file or transmission in an attempt to make the content appear different from the original digital media content.

Figure 3:
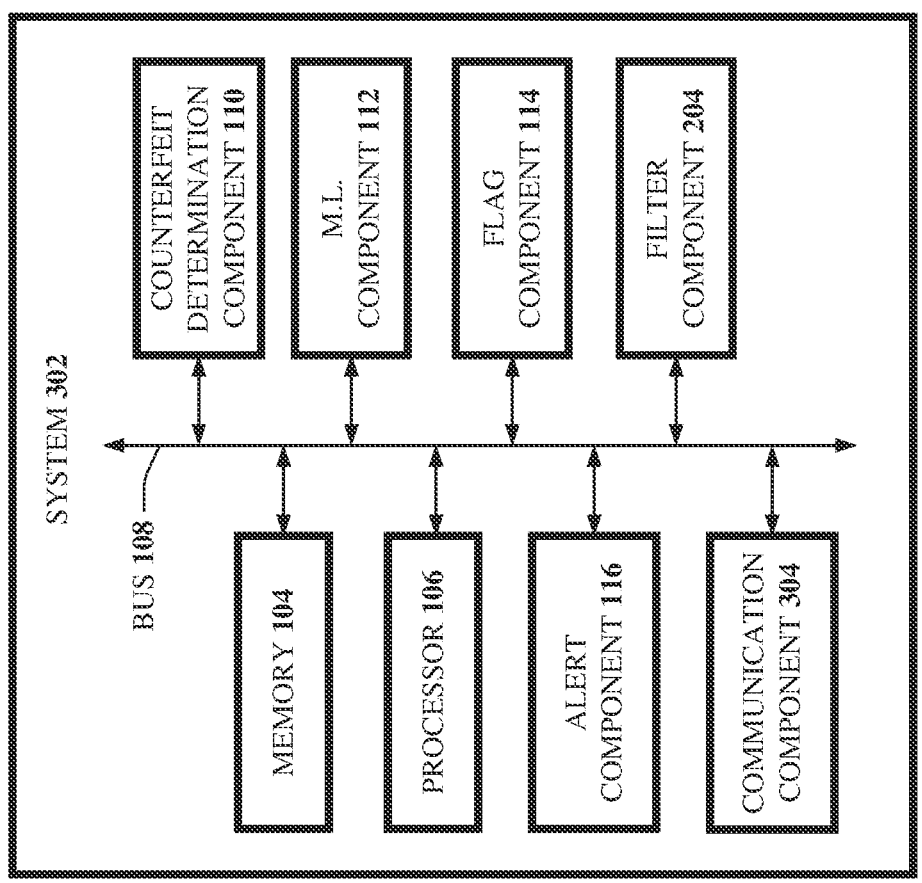
FIG. 3 is a block diagram of an exemplary system in accordance with one or more embodiments described herein.

Turning now to FIG. 3, there is illustrated an example, non-limiting system 302 in accordance with one or more embodiments herein. System 302 can comprise a computerized tool, which can be configured to perform various operations relating to multimedia piracy detection. The system 302 can be similar to system 202, and can comprise one or more of a variety of components, such as memory 104, processor 106, bus 108, counterfeit determination component 110, M.L. component 112, flag component 114, alert component 116, and/or filter component 204. The system 302 can additionally comprise a communication component 304.

In various embodiments, one or more of the memory 104, processor 106, bus 108, counterfeit determination component 110, M.L. component 112, flag component 114, alert component 116, filter component 204, and/or communication component 304 can be communicatively or operably coupled (e.g., over a bus or wireless network) to one another to perform one or more functions of the system 302.

According to an embodiment, the communication component 304 can, in response to the determination (e.g., by the counterfeit determination component 110 and/or M.L. component 112) that the digital media content threshold satisfies the defined counterfeit criterion, suspend network connectivity between a device determined to be associated with the digital media content and a network employed by the device to transmit content comprising the digital media content. In this regard, transmission of the counterfeit digital media content can be halted, thus preventing its future dissemination.

In additional embodiments, the communication component 304 can be utilized to retrieve content from a transport network herein. For example, the communication component 304 can intercept digital media content transmitted (e.g., by a fraudster) over said transport network (e.g., a fiber-based network, a cable-based network, a wireless radio access network, or another suitable network or combination of networks). For example, the communication component 304 can access a digital transport network (e.g., access IP packets transmitted over the digital content network) and analyze the network traffic for various digital media content herein. Such digital media content can thereby be analyzed by a system herein in order to determine whether such content comprises or potentially comprises counterfeit (e.g., pirated, illicit, unauthorized) digital media content.

It is noted that the communication component 304 can comprise the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, 6G, global system for mobile communications ("GSM"), code-division multiple access ("CDMA"), satellite, visual cues, radio waves, etc.)

Figure 4:
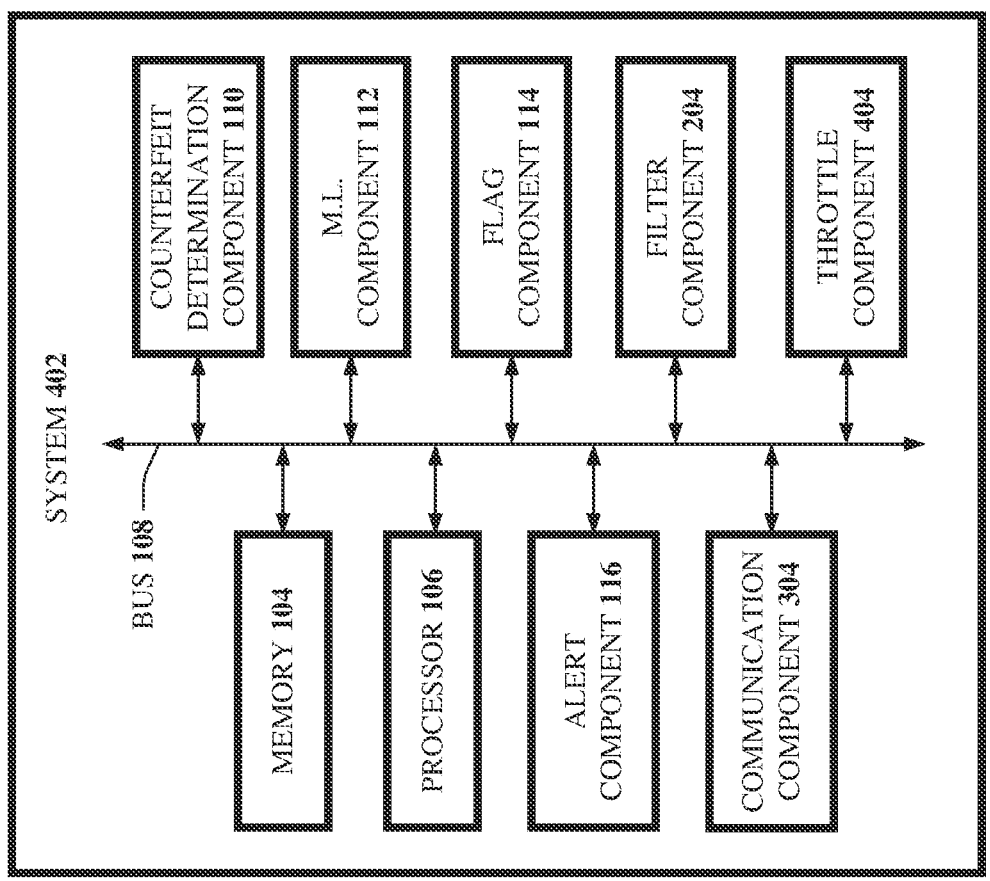
FIG. 4 is a block diagram of an exemplary system in accordance with one or more embodiments described herein.

Turning now to FIG. 4, there is illustrated an example, non-limiting system 402 in accordance with one or more embodiments herein. System 402 can comprise a computerized tool, which can be configured to perform various operations relating to multimedia piracy detection. The system 402 can be similar to system 302, and can comprise one or more of a variety of components, such as memory 104, processor 106, bus 108, counterfeit determination component 110, M.L. component 112, flag component 114, alert component 116, filter component 204, and/or communication component 304. The system 402 can additionally comprise a throttle component 404.

In various embodiments, one or more of the memory 104, processor 106, bus 108, counterfeit determination component 110, M.L. component 112, flag component 114, alert component 116, filter component 204, communication component 304, and/or throttle component 404 can be communicatively or operably coupled (e.g., over a bus or wireless network) to one another to perform one or more functions of the system 402.

According to an embodiment, the throttle component 404 can, in response to the determination (e.g., by the counterfeit determination component 110) that the digital media content threshold satisfies the defined counterfeit criterion, bandwidth throttle a connection between a device determined to be associated with the digital media content and a network (e.g., a transport network herein) via which the device is determined to transmit content comprising the digital media content. In this regard, bandwidth throttling the connection can comprise limiting onward communication speed between the device and the network to less than a communication speed determined to be sufficient for uninterrupted transmission of the digital media content via the network. If, for example, the throttle component 404 determines that the counterfeit digital media content requires 10 megabits per second (Mbps) to stream (e.g., without buffering), the throttle component can bandwidth throttle the connection between the device determined to be associated with the digital media content and the network 5 Mbps, thus limiting the devices' ability to effectively stream the counterfeit digital media content. It is noted that some streaming configurations can be responsive to changes in available bandwidth. In this regard, a fraudster entity could attempt to modify the streamed resolution of the counterfeit digital media content in an attempt to circumvent the bandwidth throttling. In this regard, the throttle component 404 continuously update the bandwidth throttling to account for changes in the stream of the counterfeit digital media content. For example, if a fraudster entity modifies the stream of the counterfeit digital media content from 4K to 720P, the throttle component 404 can further bandwidth throttle the connection in order to prevent transmission at 720P resolution.

Figure 5:
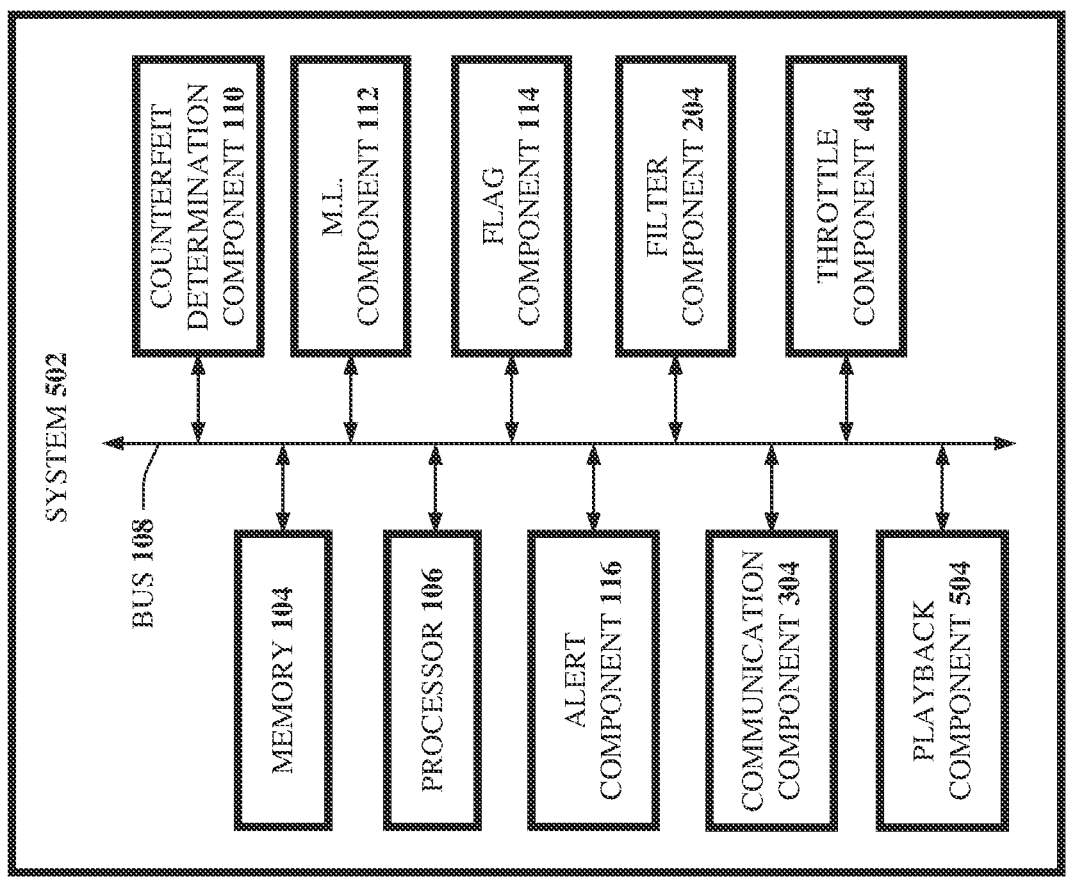
FIG. 5 is a block diagram of an exemplary system in accordance with one or more embodiments described herein.

Turning now to FIG. 5, there is illustrated an example, non-limiting system 502 in accordance with one or more embodiments herein. System 502 can comprise a computerized tool, which can be configured to perform various operations relating to multimedia piracy detection. The system 502 can be similar to system 402, and can comprise one or more of a variety of components, such as memory 104, processor 106, bus 108, counterfeit determination component 110, M.L. component 112, flag component 114, alert component 116, filter component 204, communication component 304, and/or throttle component 404. The system 502 can additionally comprise a playback component 504.

In various embodiments, one or more of the memory 104, processor 106, bus 108, counterfeit determination component 110, M.L. component 112, flag component 114, alert component 116, filter component 204, communication component 304, throttle component 404, and/or playback component 504 can be communicatively or operably coupled (e.g., over a bus or wireless network) to one another to perform one or more functions of the system 502.

According to an embodiment, in response to the determination (e.g., by the counterfeit determination component 110) that the digital media content threshold satisfies the defined counterfeit criterion, the playback component 504 can facilitate (e.g., non-broadcasted) playback of the potentially counterfeit digital media content. In this regard, such playback can be local to the system 502 (e.g., not publicly accessible). Further in this regard, the counterfeit determination component 110 and/or M.L. component 112 can compare the potentially counterfeit digital media content (e.g., played via the playback component 504) to the original digital media content, and in response to a determination (e.g., by the counterfeit determination component 110 and/or M.L. component 112) that the counterfeit or potentially counterfeit digital media content and original digital media content threshold satisfy a similarity criterion, the counterfeit determination component 110 and/or M.L. component 112 can determine that the counterfeit or potentially counterfeit digital media content comprises counterfeit digital media content.

Figure 6:
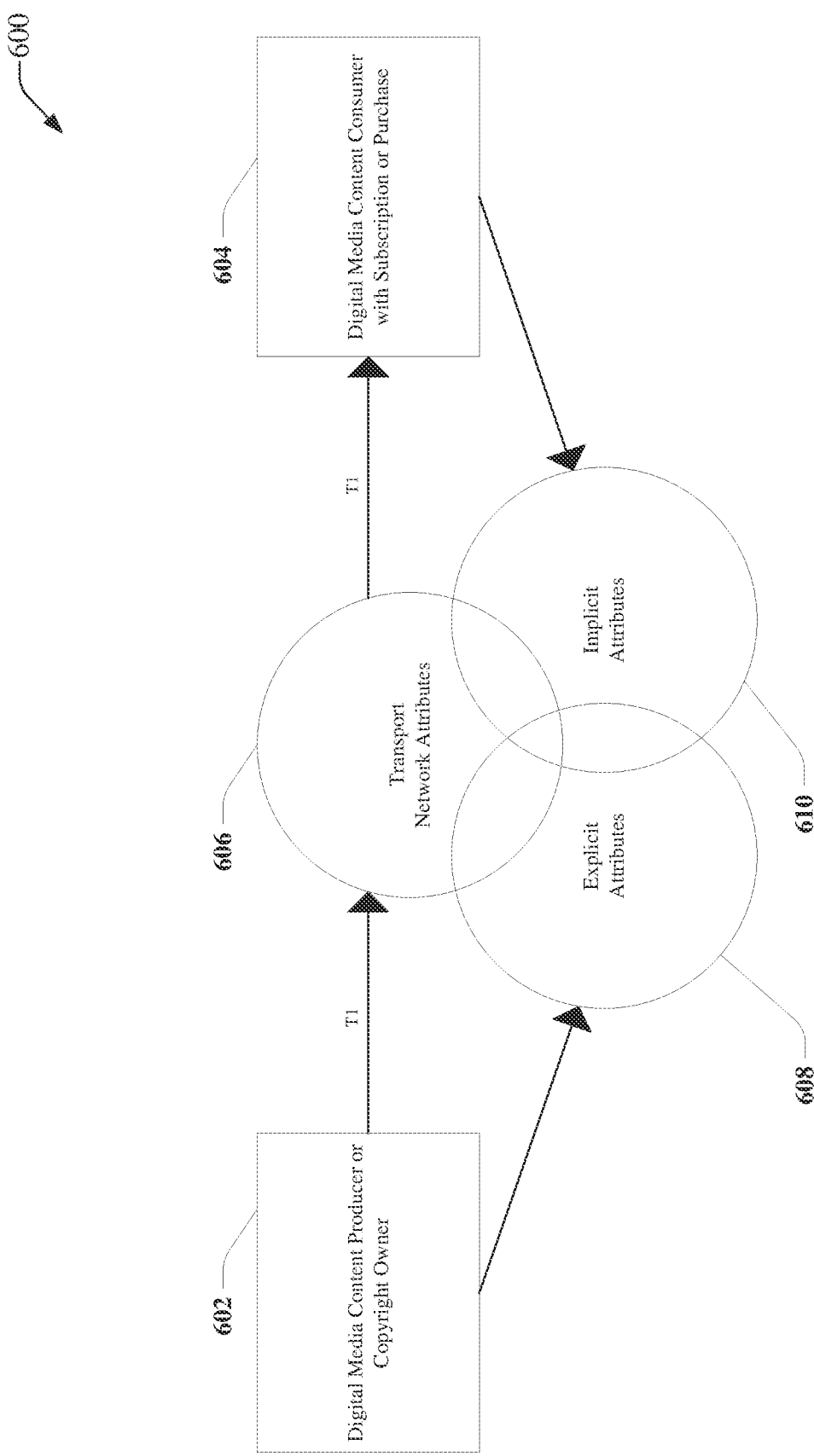
FIG. 6 is a block diagram of digital media distribution in accordance with one or more embodiments described herein.

With reference to FIG. 6, there is illustrated a block diagram 600 of digital media distribution in accordance with one or more embodiments described herein. For example, consumers (e.g., digital media content consumer entities with subscription or purchase 604) often subscribe to one or more media providers services (e.g., Netflix, Hulu, Amazon Prime Video, Disney+, Discovery Plus, Paramount Plus, HBO Max, YouTube TV, fuboTV, DirecTV Stream, or other digital media provider entities (e.g., digital media content producer or copyright owner entity 602). It is noted that digital media content and associated distribution comprise explicit attributes 608 and/or implicit attributes 610, and some of such attributes can be determined and/or analyzed during rendering of associated content. For example, an internet service provider (ISP) can observe, transport network attributes 606 (e.g., over a transport network), such as a higher multicasting internet protocol (IP) traffic rate during the release of a new movie. Other attributes are specific to the digital content formats, digital storage formats (e.g., mpeg-4, with respective sets of files, directories, and compression algorithms). It is noted that the time to stream digital media content from the digital media content producer or copyright owner entity to the digital media content consumer entity with subscription or purchase can be nearly instantaneous (e.g., data transmitted at the speed of light over a fiber optic connection).

Figure 7:
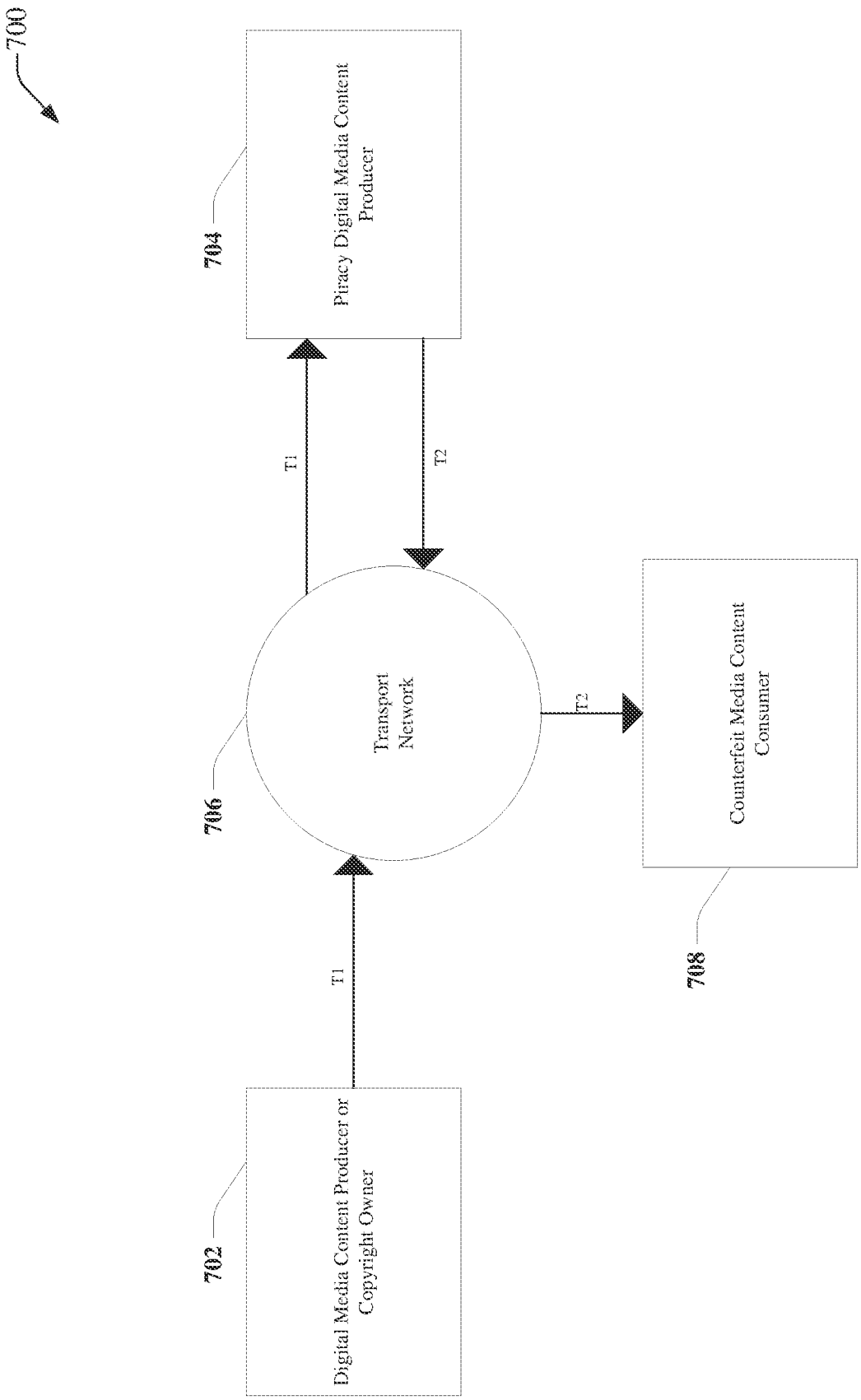
FIG. 7 is a block diagram of piracy medium distribution in accordance with one or more embodiments described herein.

FIG. 7 illustrates a block diagram 700 of piracy medium distribution in accordance with one or more embodiments described herein. According to an example, a fraudster entity (e.g., piracy digital media content producer entity 704), being a legitimate subscriber of a media content provider's services, can obtain media content (for one or more subscriber entity's viewing only) from a valid source (e.g., digital media content producer or copyright owner entity 702) via the internet (e.g., transport network 706). The fraudster entity then can capture the contents using one or more of a variety of methods, then resell the contents illegally. One such method can comprise camripping a just-released movie, then streaming it out to the fraudster entity's subscribers (e.g., via internet.) It is noted that rebroadcasting digital media content can require time to execute, especially if alternations are made to the digital media content (e.g., changes in resolution, format, addition of watermarks, or other alterations or modifications). Thus, while digital media content can be transmitted at T1, counterfeit digital media content would be transmitted at T2, later in time than T1, due the inherent time required to convert, camrip, or perform other alterations of original digital media content in the attempt to evade detection. In this regard, though original media content can be transmitted from a digital media content producer or copyright owner entity 702 to a piracy digital media content producer entity 704 or a legitimate digital media subscriber entity, a counterfeit media content consumer entity 708 would not receive the counterfeit digital media content at the same time that the piracy digital media content producer entity 704 or the legitimate digital media subscriber entity received the original digital media content. Thus, the difference in time of streaming can be representative of an attribute that differentiates a broadcast or stream of an original digital media content from a counterfeit or potentially counterfeit digital media broadcast or stream.

Figure 8:
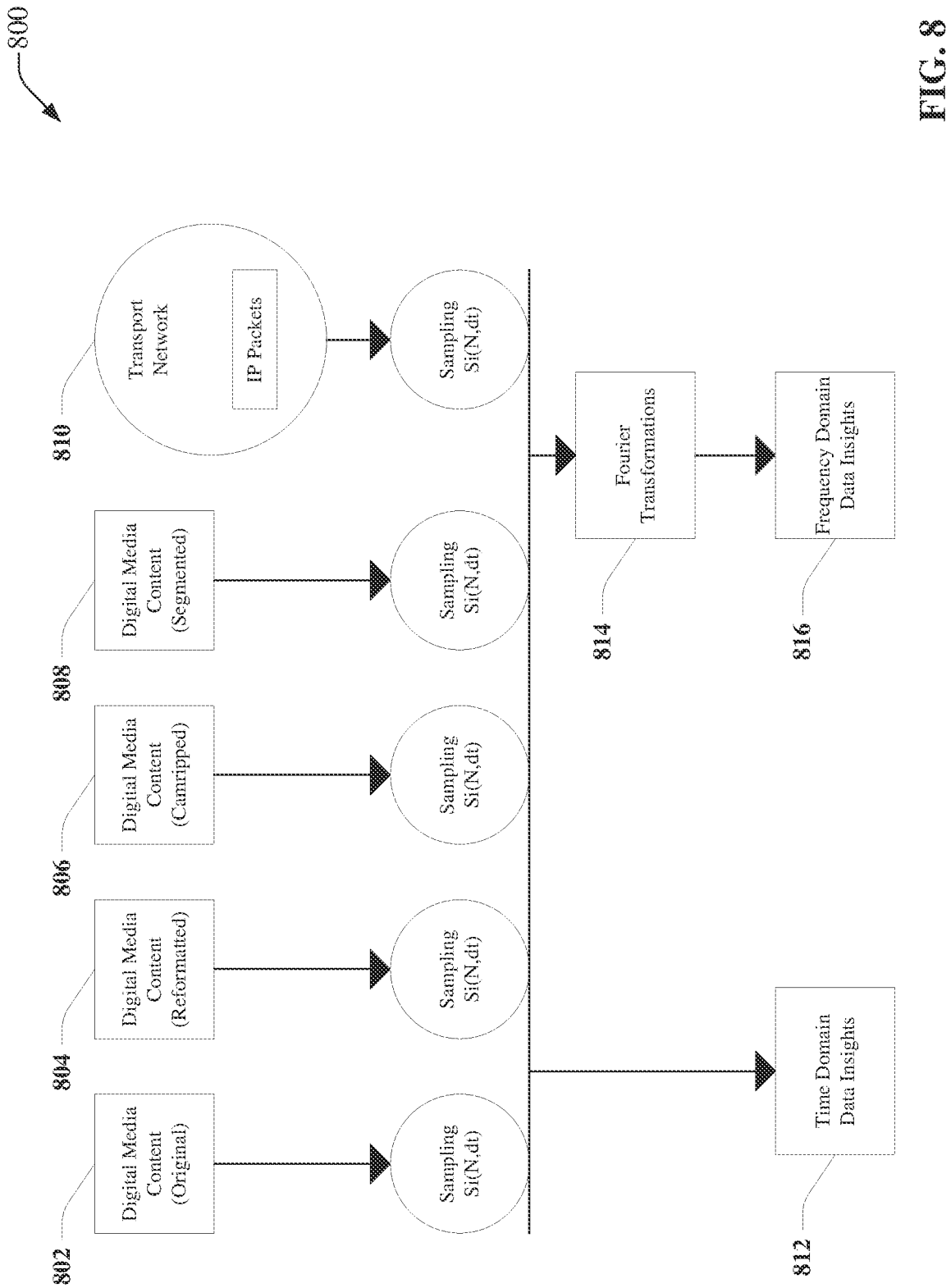
FIG. 8 is a block diagram of multi-stage machine training phases in accordance with one or more embodiments described herein.

Turning now to FIG. 8, there is illustrated a block diagram 800 of multi-stage machine training phases in accordance with one or more embodiments described herein. It is noted that each phase herein can be conducted simultaneously. In a first phase, various samples of original media content can be gathered and/or generated (e.g., by a system 102 and/or associated component). In this regard, original digital media content 802, reformatted digital media content 804, camripped digital media content 806, segmented digital media content 808, and/or IP packets from the transport network at 810 can each be retrieved or generated by a system herein (e.g., using a communication component 304). It is noted that each of the regard original digital media content 802, reformatted digital media content 804, camripped digital media content 806, segmented digital media content 808, and/or IP packets can be associated with respective set(s) of operations. In this regard, a system herein (e.g., system 102, system 202, system 302, system 402, or system 502) can perform simultaneous sampling (e.g., via the M.L. component 112) of internet distributable digital media content in different stages, in which each phase is a time series, Si(N, dt), in which i represents the media transferring stage, N represents the quantity of samples, and dt represents the sampling interval. According to an example, original digital media content can comprise a movie in an mpeg-4 format or a live broadcast. A system herein can convert the original movie format into, for instance, one or more of .webm, .mkv, .flv, .vob, .ogv, .ogg, .drc, .gif, .jpg, .gifv, .mng, .avi, .MTS, .M2TS, .TS, .mov, .qt, .wmv, .yuv, .rm, .rmvb, .viv, .asf, .amv, .mpg, .mpg, .svi, 0.3pg, 0.3g2, .mxf, .roq, .nsv, .f4v, .frp, .f4a, .f4b, or other suitable formats. Likewise, audio content can be converted across various audio file formats, such as 0.3gp, .aa, .aac, .aax, .act, .aiff, .alac, .amr, .ape, .au, .awb, .dss, .dvf, .flac, .gsm, .iklax, .ivs, .m4a, m4b, .m4p, m4p, .mmf, .mp3, .mpc, .msv, .nmf, .ogg, .oga, .mogg, .opus, .ra, .rm, .raw, .rf64, .sln, .tta, .voc, .vox, .wav, .wma, .wv, .webm, 0.8svx, .cda, or other suitable formats. Similarly, video resolution or audio quality can be converted. (e.g., video resolution can be changed from 4K to 1080P or 720P and/or to/from other suitable resolutions). A system herein can further generate a camrip of original digital media content (e.g., a movie) at 806. Likewise, a system herein can segment original, reformatted, camripped, or other original digital media content into smaller sections or clips of said content for use in the generation of data insights herein. It is noted that the transport network 810 also carries other traffic (e.g., other than the original digital media content and/or counterfeit digital media content. For example, under normal circumstances, the transport network 810 can also transmit other streaming content, IP phone calls, web browsing, online gaming, internet radio streaming, and other content along with the above-noted original digital media content. Therefore, a Fourier Transformation function, a Laplace Transformation function, and/or another suitable transformation function can be utilized to isolate content and/or filter noise to differentiate the content transmitted over the transport network 810. The foregoing can also be utilized to determine patterns for user entities and/or determine a suspicion score representative of a level of suspicion that a user profile associated with a user entity is engaged in digital media piracy. If, for instance, user profile achieves a level of suspicion that exceeds a defined suspicion threshold, then a corresponding action can be taken (e.g., flagging, alarm generation, throttling, suspension, or other suitable actions). The foregoing operations can be provisioned dynamically, for instance, based on the stage, implicit or explicit attributes of respective media, and/or transport network attributes. Additionally, a rule engine can supply (e.g., using the M.L. component 112) a set of machine-learning rules to optimize the sampling process and its required computing resources usage. According to a nonlimiting example, a system herein can utilize use $N=2^{10}$, $t=1$ second for an mpeg-4 movie, with 20 directories and files, using the HTTP protocol, for a 156 minute duration movie.

A second phase can comprise converting samples to different domains (e.g., from a time domain to a frequency domain) (e.g., using a Fourier Transform). During this second phase, a filter (e.g., filter component 204) can be utilized to remove data points representative outliners or noise. For example, such a filter (e.g., a signal filter) can be configured to filter out signals that may have been added to an original video or audio file or transmission in an attempt to make the content appear different from the original.

In a third phase, a system herein can consolidate all samples in both domains (e.g., time domain and frequency domain) into their corresponding data insights. Data insights can be utilized by a system herein, for instance, to determine whether digital media content comprises counterfeit digital media content or potentially counterfeit digital media content. For example, such insights can comprise data representative of comparisons of implicit and/or explicit attributes herein. In this regard, such insights can comprise data representative of a comparison between an attribute associated with the original digital media content and an attribute associated with the digital media content.

Figure 9:
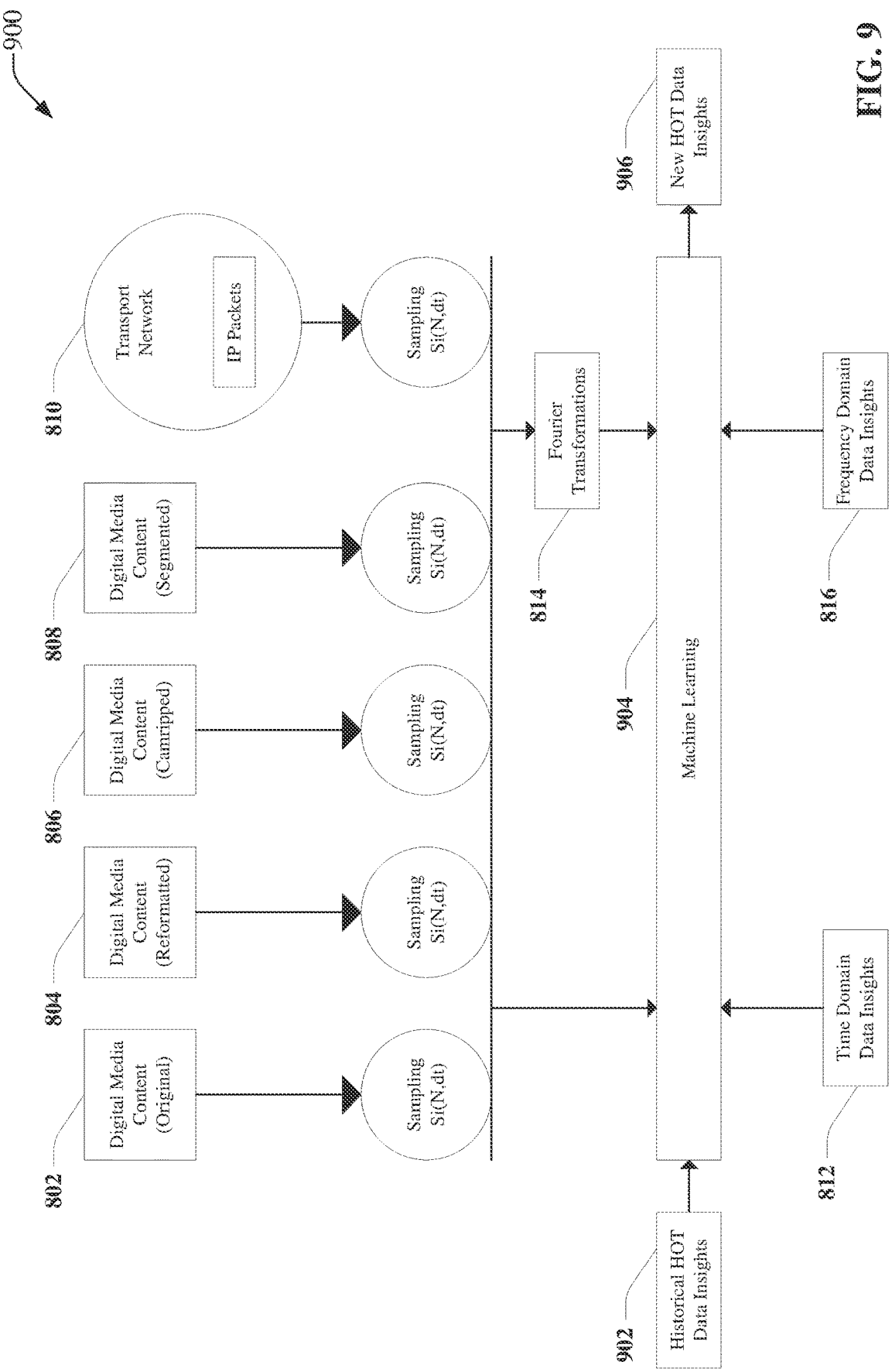
FIG. 9 is a block diagram of multi-stage sampling during real-time rendering phases in accordance with one or more embodiments described herein.

With reference to FIG. 9, there is illustrated a block diagram 900 of multi-stage sampling during real-time rendering phases in accordance with one or more embodiments described herein. According to an embodiment, block diagram 900 can comprise a fourth phase, fifth phase, and sixth phase. During phase four, samples similar to those taken or generated in phase two can be taken (e.g., in real-time or near real-time) during the active rendering of the original media contents, for example, during the time of an initial release a new movie, or a live broadcasting of a sport event. In a fifth phase, real-time samples can be transformed (e.g., using a Fourier Transformation) into a different domain (e.g., into a frequency domain from a time domain). Next, real-time rendering samples can be utilized in a sixth phase, which can comprise utilizing machine learning herein (e.g., using the M.L. component 112) to conduct pattern-matching with data form the aforementioned insights. In this regard, an M.L. component 112 can determine probabilities that certain digital media content is "HOT" (potentially involved with a fraudulent event or person). It is noted that historical HOT data insights can be utilized by the M.L. component 112 herein. Further, counterfeit digital media content models herein can be updated (e.g., by the M.L. component 112) based on acquired digital media content and respective insights.

Figure 10:
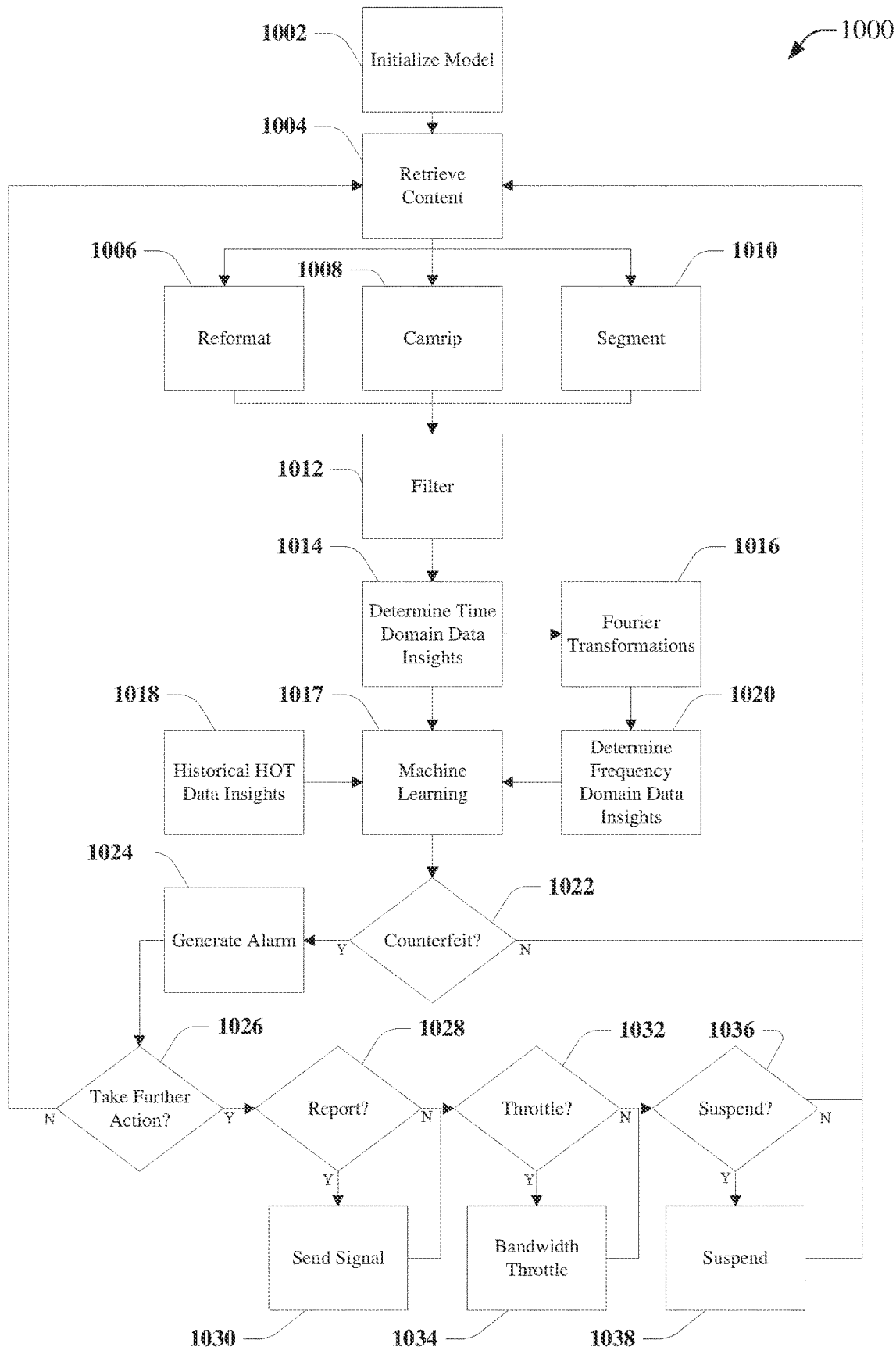
FIG. 10 is a flowchart for a process associated with multimedia piracy detection in accordance with one or more embodiments described herein.

Turning now to FIG. 10, there is illustrated a flow chart of a process 1000 relating to multimedia piracy detection in accordance with one or more embodiments described herein. At 1002 a counterfeit digital media content model can be initialized (e.g., using an M.L. component 112). At 1004, digital media content can be retrieved (e.g., using communication component 304). For example, such digital media content can be retrieved from web streams, file sharing sites, or otherwise obtained. At 1006, the retrieved content can be reformatted (e.g., using an M.L. component 112). For example, such reformatting can comprise file format changes, changes in resolution, changes in quality, application or removal of watermarks, or other suitable reformatting. At 1008, the retrieved content can be camripped (e.g., using an M.L. component 112). It is noted that such camripping can comprise virtual camripping configured to be similar to the effect of physical camripping. At 1010, the retrieved content can be segmented (e.g., using an M.L. component 112). At 1012, one or more of the reformatted content, camripped content, or segmented content can be filtered (e.g., using a signal filter such as a filter component 204). At 1014, data insights in a time domain can be determined (e.g., using an M.L. component 112). At 1016, a Fourier Transform can be performed (e.g., using an M.L. component 112) on a time domain, which can enable data insights in a frequency domain to be determined (e.g., using an M.L. component 112) at 1020 based on, for instance, attributes associated with the digital media content. At 1017, machine learning can be utilized (e.g., using an M.L. component 112) using the time domain data insights from 1014, the frequency domain data insights at 1020, and/or historical HOT data insights from 1018 in order to determine at 1022 whether digital media content retrieved at 1004 comprises counterfeit digital media content. If the content is determined (e.g., using the counterfeit determination component 110 and/or M.L. component 112) not to comprise counterfeit digital media content, the process can return to 1004 or end.

If the content is determined to comprise counterfeit digital media content, the process can proceed to 1024 at which an alarm can be generated (e.g., using the alert component 116). At 1026, if any further actions are to be taken by a system herein (e.g., according to a defined setting or as determined by the M.L. component 112), the process can proceed to 1028. Otherwise, the process can return to 1004 or end. At 1028, if a report is to be generated (e.g., according to a defined setting or as determined by the M.L. component 112), signal representative of the report can be generated at 1030 (e.g., using the communication component 304). At 1032, if bandwidth throttling is to be conducted (e.g., according to a defined setting or as determined by the M.L. component 112), said bandwidth throttling can be performed at 1034 (e.g., using the throttle component 404). At 1036, if network connectivity is to be suspended (e.g., according to a defined setting or as determined by the M.L. component 112), said suspension can be performed at 1038 (e.g., using the throttle component 404, communication component 304, or another suitable component).

Figure 11:
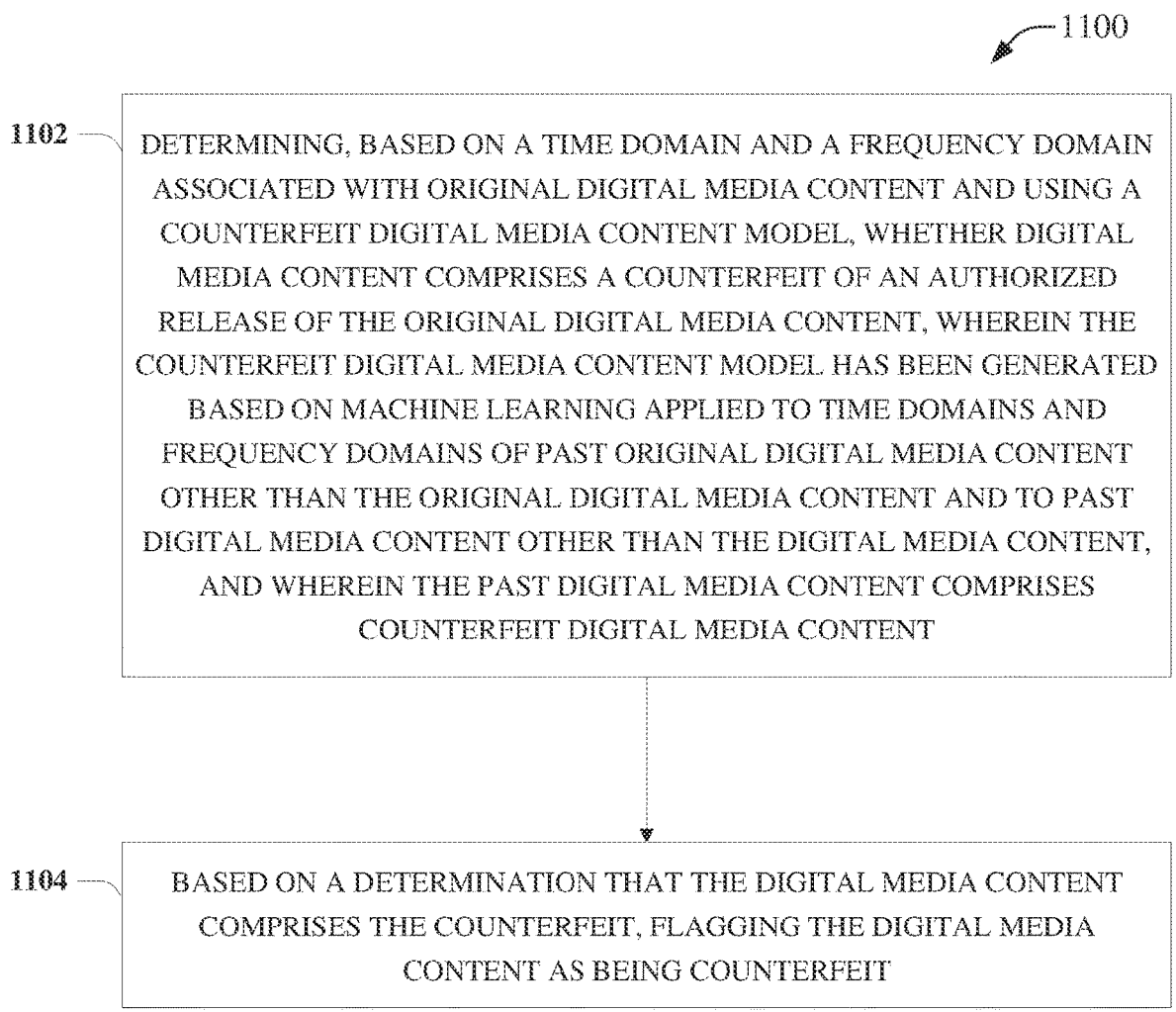
FIG. 11 is a block flow diagram for a process associated with multimedia piracy detection in accordance with one or more embodiments described herein.

FIG. 11 illustrates a block flow diagram for a process 1100 associated with multimedia piracy detection in accordance with one or more embodiments described herein. At 1102, the process 1100 can comprise determining (e.g., using a counterfeit determination component 110), based on a time domain and a frequency domain associated with original digital media content and using a counterfeit digital media content model, whether digital media content comprises a counterfeit of an authorized release of the original digital media content, wherein the counterfeit digital media content model has been generated (e.g., using an M.L. component 112) based on machine learning applied to time domains and frequency domains of past original digital media content other than the original digital media content and to past digital media content other than the digital media content, and wherein the past digital media content comprises counterfeit digital media content. At 1104, the process 1100 can comprise based on a determination that the digital media content comprises the counterfeit, flagging (e.g., using the flag component 114) the digital media content as being counterfeit.

FIG. 12 illustrates a block flow diagram for a process 1200 associated with multimedia piracy detection in accordance with one or more embodiments described herein. At 1202, the process 1200 can comprise determining (e.g., using a counterfeit determination component 110), based on a frequency domain associated with original digital media content and using a counterfeit digital media content model, whether digital media content comprises a counterfeit of an approved release of the original digital media content, wherein the counterfeit digital media content model has been generated (e.g., using an M.L. component 112) based on machine learning applied to time domains and frequency domains of past original digital media content other than the original digital media content and to past digital media content other than the digital media content, and wherein the past digital media content comprises counterfeit digital media content. At 1204, the process 1200 can comprise based on a determination that the digital media content threshold satisfies a defined counterfeit criterion, determining that the digital media content comprises potentially counterfeit digital media content (e.g., using the counterfeit determination component 110 and/or flag component 114).

FIG. 13 illustrates a block flow diagram for a process 1300 associated with multimedia piracy detection in accordance with one or more embodiments described herein. At 1302, the process 1300 can comprise determining (e.g., using a counterfeit determination component 110), by network equipment comprising a processor, based on a frequency domain associated with original digital media content and using a counterfeit digital media content model, whether digital media content comprises a counterfeit of the original digital media content, wherein the counterfeit digital media content model has been generated (e.g., using the M.L. component 112) based on machine learning applied to time domains and frequency domains of past original digital media content other than the original digital media content and to past digital media content other than the digital media content, and wherein the past digital media content comprises counterfeit digital media content. At 1304, the process 1300 can comprise based on a determination that the digital media content threshold satisfies a defined counterfeit criterion, determining (e.g., using the counterfeit determination component 110 and/or flag component 114), by the network equipment, that the digital media content comprises potentially counterfeit digital media content. At 1306, the process 1300 can comprise in response to the determining that the digital media content comprises potentially counterfeit digital media content, sending (e.g., using an alert component 116 and/or communication component 304), by the network equipment to a device communicatively coupled to the network equipment, an alert signal representative of the determination that the digital media content comprises potentially counterfeit digital media content.

Figure 14:
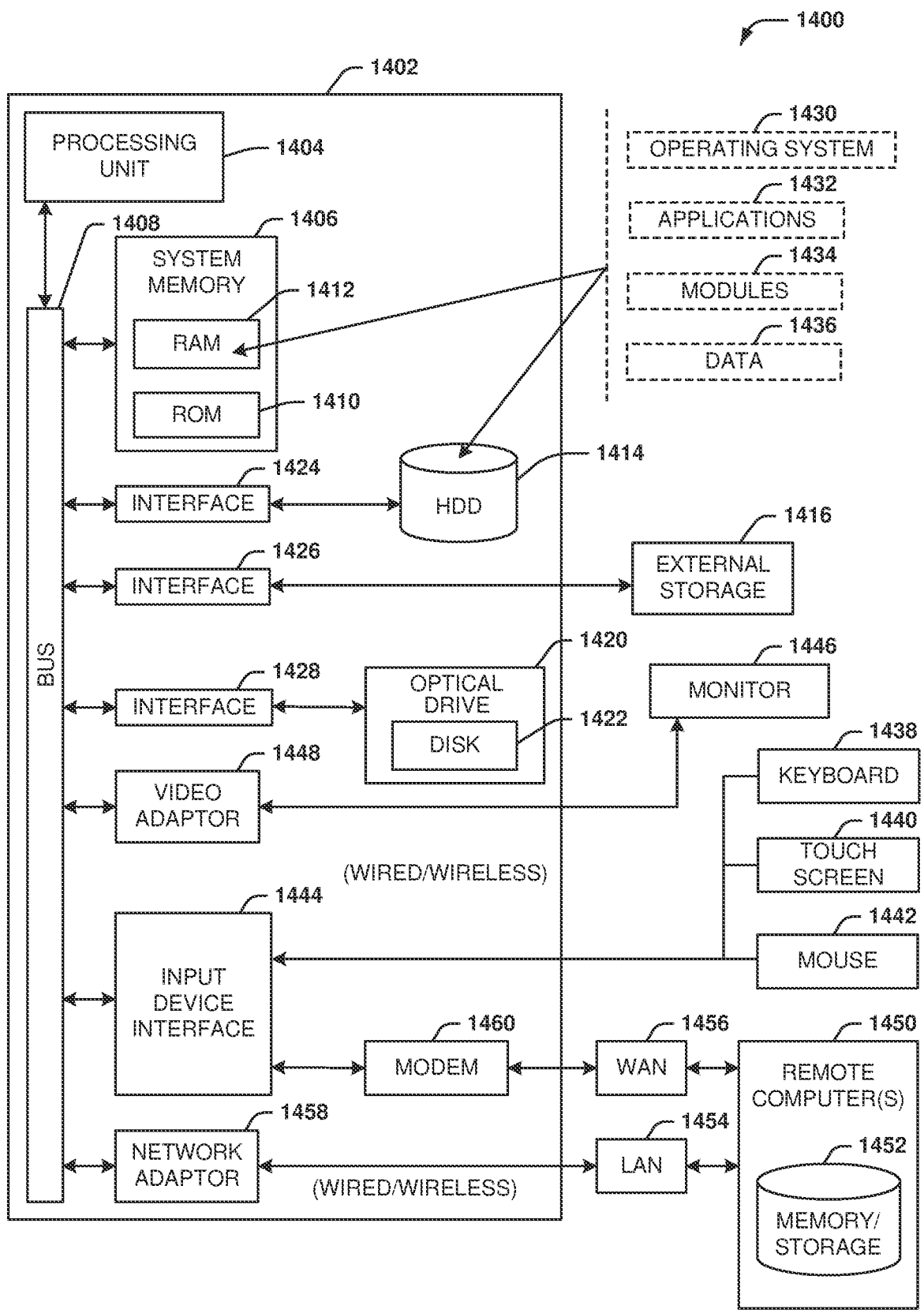
FIG. 14 is an example, non-limiting computing environment in which one or more embodiments described herein can be implemented.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid-state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 15:
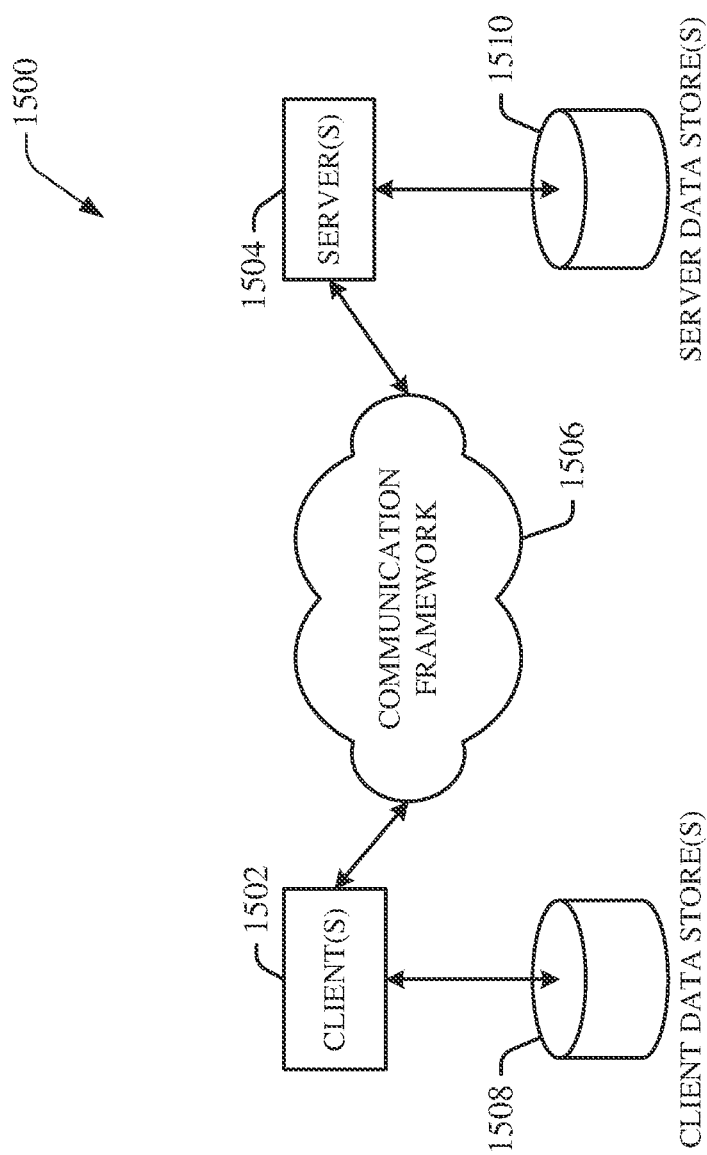
FIG. 15 is an example, non-limiting networking environment in which one or more embodiments described herein can be implemented.

Referring now to FIG. 15, there is illustrated a schematic block diagram of a computing environment 1500 in accordance with this specification. The system 1500 includes one or more client(s) 1502, (e.g., computers, smart phones, tablets, cameras, PDA's). The client(s) 1502 can be hardware and/or software (e.g., threads, processes, computing devices). The client(s) 1502 can house cookie(s) and/or associated contextual information by employing the specification, for example.

The system 1500 also includes one or more server(s) 1504. The server(s) 1504 can also be hardware or hardware in combination with software (e.g., threads, processes, computing devices). The servers 1504 can house threads to perform transformations of media items by employing aspects of this disclosure, for example. One possible communication between a client 1502 and a server 1504 can be in the form of a data packet adapted to be transmitted between two or more computer processes wherein data packets may include coded analyzed headspaces and/or input. The data packet can include a cookie and/or associated contextual information, for example. The system 1500 includes a communication framework 1506 (e.g., a global communication network such as the Internet) that can be employed to facilitate communications between the client(s) 1502 and the server(s) 1504.

Communications can be facilitated via a wired (including optical fiber) and/or wireless technology. The client(s) 1502 are operatively connected to one or more client data store(s) 1508 that can be employed to store information local to the client(s) 1502 (e.g., cookie(s) and/or associated contextual information). Similarly, the server(s) 1504 are operatively connected to one or more server data store(s) 1510 that can be employed to store information local to the servers 1504.

In one exemplary implementation, a client 1502 can transfer an encoded file, (e.g., encoded media item), to server 1504. Server 1504 can store the file, decode the file, or transmit the file to another client 1502. It is noted that a client 1502 can also transfer uncompressed file to a server 1504 and server 1504 can compress the file and/or transform the file in accordance with this disclosure. Likewise, server 1504 can encode information and transmit the information via communication framework 1506 to one or more clients 1502.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable instructions that, when executed by the processor, facilitate performance of operations, the operations comprising:
determining, based on a time domain and a frequency domain associated with original digital media content and using a counterfeit digital media content model, whether digital media content comprises a counterfeit of an authorized release of the original digital media content, wherein the counterfeit digital media content model has been generated based on machine learning applied to time domains and frequency domains of past original digital media content other than the original digital media content and to past digital media content other than the digital media content, and wherein the past digital media content comprises counterfeit digital media content;
based on a determination that a digital media content threshold satisfies a defined counterfeit criterion, determining that the digital media content comprises potentially counterfeit digital media content;
in response to the determination that the digital media content threshold satisfies the defined counterfeit criterion, facilitating a non-broadcasted playback of the potentially counterfeit digital media content;
comparing the potentially counterfeit digital media content to the original digital media content; and
in response to a determination that the potentially counterfeit digital media content and the original digital media content satisfy a similarity criterion, determining that the potentially counterfeit digital media content comprises the counterfeit digital media content.

2. The system of claim 1, wherein the counterfeit digital media content model has been further generated based on an output of a process, comprising:
concurrently sampling, in the time domain, the past original digital media content and the past digital media content; and
based on a first past result of concurrently sampling, in the time domain, the past original digital media content and the past digital media content, determining a second past result, wherein the second past result comprises the frequency domain associated with the first past result.

3. The system of claim 2, wherein the counterfeit digital media content model has been further generated by filtering the first past result using a first signal filter and the second past result using a second signal filter.

4. The system of claim 1, wherein the counterfeit digital media content model has been further generated based on a result of a comparison between an attribute associated with the past original digital media content and an attribute associated with the past digital media content, and wherein the determining the digital media content comprises the potentially counterfeit digital media content is further based on a result of a comparison between an attribute associated with the original digital media content and an attribute associated with the digital media content.

5. The system of claim 4, wherein the attribute associated with the original digital media content comprises an implicit attribute.

6. The system of claim 5, wherein the implicit attribute comprises a compression attribute associated with the original digital media content.

7. The system of claim 5, wherein the implicit attribute comprises a start time associated with the original digital media content or an end time associated with the original digital media content.

8. The system of claim 4, wherein the attribute associated with the original digital media content comprises an explicit attribute.

9. The system of claim 8, wherein the explicit attribute comprises a start time or an end time of an event associated with the original digital media content.

10. The system of claim 8, wherein the explicit attribute comprises advertisement information representative of an advertisement associated with the original digital media content.

11. A non-transitory machine-readable medium, comprising executable instructions that, when executed by a processor, facilitate performance of operations, the operations comprising:
determining, based on a frequency domain associated with original digital media content and using a counterfeit digital media content model, whether digital media content comprises a counterfeit of an approved release of the original digital media content, wherein the counterfeit digital media content model has been generated based on machine learning applied to time domains and frequency domains of past original digital media content other than the original digital media content and to past digital media content other than the digital media content, and wherein the past digital media content comprises counterfeit digital media content;
based on a determination that a digital media content threshold satisfies a defined counterfeit criterion, determining that the digital media content comprises potentially counterfeit digital media content;
in response to the determination that the digital media content threshold satisfies the defined counterfeit criterion, facilitating a non-broadcasted playback of the potentially counterfeit digital media content;
comparing the potentially counterfeit digital media content to the original digital media content; and
in response to a determination that the potentially counterfeit digital media content and the original digital media content satisfy a similarity criterion, determining that the potentially counterfeit digital media content comprises the counterfeit digital media content.

12. The non-transitory machine-readable medium of claim 11, wherein the original digital media content comprises a segment of video or audio content.

13. The non-transitory machine-readable medium of claim 11, wherein the operations further comprise:
in response to the determination that the digital media content threshold satisfies the defined counterfeit criterion, suspending network connectivity between a device determined to be associated with the digital media content and a network employed by the device to transmit content comprising the digital media content.

14. The non-transitory machine-readable medium of claim 11, wherein the operations further comprise:
in response to the determination that the digital media content threshold satisfies the defined counterfeit criterion, bandwidth throttling a connection between a device determined to be associated with the digital media content and a network via which the device is determined to transmit content comprising the digital media content, wherein the bandwidth throttling the connection comprises limiting onward communication speed between the device and the network to less than a communication speed determined to be sufficient for uninterrupted transmission of the digital media content via the network.

15. The non-transitory machine-readable medium of claim 11, wherein the digital media content comprises a live streaming broadcast of an event.

16. The non-transitory machine-readable medium of claim 11, wherein the digital media content comprises prerecorded digital media content.

17. A method, comprising:
   determining, by network equipment comprising a processor, based on a frequency domain associated with original digital media content and using a counterfeit digital media content model, whether digital media content comprises a counterfeit of the original digital media content, wherein the counterfeit digital media content model has been generated based on machine learning applied to time domains and frequency domains of past original digital media content other than the original digital media content and to past digital media content other than the digital media content, and wherein the past digital media content comprises counterfeit digital media content;
   based on a determination that a digital media content threshold satisfies a defined counterfeit criterion, determining, by the network equipment, that the digital media content comprises potentially counterfeit digital media content;
   in response to the determining that the digital media content comprises the potentially counterfeit digital media content, sending, by the network equipment to a device communicatively coupled to the network equipment, an alert signal representative of the determination that the digital media content comprises the potentially counterfeit digital media content;
   in response to the determination that the digital media content threshold satisfies the defined counterfeit criterion, facilitating a non-broadcasted playback of the potentially counterfeit digital media content;
   comparing the potentially counterfeit digital media content to the original digital media content; and
   in response to a determination that the potentially counterfeit digital media content and original digital media content satisfy a similarity criterion, determining that the potentially counterfeit digital media content comprises counterfeit digital media content.

18. The method of claim 17, wherein the counterfeit digital media content model was further generated by:
   concurrently sampling, by the network equipment, in a time domain, the past original digital media content and the past digital media content; and
   based on a first past result of concurrently sampling in the time domain, the past original digital media content and the past digital media content, determining, by the network equipment, a second past result, wherein the second past result comprises the frequency domain associated with the first past result.

19. The method of claim 17, wherein:
   the counterfeit digital media content model was further generated, by the network equipment, based on a result of a comparison between an attribute associated with the past original digital media content and an attribute associated with the past digital media content, and
   the determining the digital media content comprises the potentially counterfeit digital media content is further based on a result of a comparison, by the network equipment, between an attribute associated with the original digital media content and an attribute associated with the digital media content.

20. The method of claim 19, wherein the attribute associated with the original digital media content comprises an implicit attribute.

* * * * *